United States Patent
Amin-Sanayei et al.

(10) Patent No.: US 11,661,508 B2
(45) Date of Patent: May 30, 2023

(54) FLUOROPOLYMER THERMOPLASTIC ELASTOMER

(71) Applicant: Arkema France, Colombes (FR)

(72) Inventors: Ramin Amin-Sanayei, Malvern, PA (US); Samuel Devisme, Rouen (FR); Florent Abgrall, Bernay (FR); Jerome Chauveau, Mesnil en Ouche (FR); Anthony Bonnet, Saint Laurent de Mure (FR); Gregory O'Brien, Downingtown, PA (US)

(73) Assignee: Arkema France, Colombes (FR)

( * ) Notice: Subject to any disclaimer, the term of this patent is extended or adjusted under 35 U.S.C. 154(b) by 605 days.

(21) Appl. No.: 16/617,024

(22) PCT Filed: Jun. 4, 2018

(86) PCT No.: PCT/EP2018/064546
§ 371 (c)(1),
(2) Date: Nov. 26, 2019

(87) PCT Pub. No.: WO2018/224412
PCT Pub. Date: Dec. 13, 2018

(65) Prior Publication Data
US 2021/0130598 A1   May 6, 2021

(30) Foreign Application Priority Data
Jun. 6, 2017   (FR) ...................... 1755032

(51) Int. Cl.
| C08L 27/16 | (2006.01) |
| B29C 43/00 | (2006.01) |
| B29K 21/00 | (2006.01) |
| B29K 27/00 | (2006.01) |

(52) U.S. Cl.
CPC ............ C08L 27/16 (2013.01); B29C 43/003 (2013.01); B29K 2021/003 (2013.01); B29K 2027/16 (2013.01)

(58) Field of Classification Search
CPC ............................. C08L 27/16; B29C 43/003
See application file for complete search history.

(56) References Cited

U.S. PATENT DOCUMENTS

| 6,586,547 B1 | 1/2003 | Amin-Sanayei et al. |
| 6,568,547 B1 | 5/2003 | Kretschmer et al. |
| 7,718,727 B2 | 5/2010 | Hartmann et al. |
| 2008/0032836 A1* | 2/2008 | Konno ...................... F16H 7/18 474/140 |
| 2011/0009572 A1 | 1/2011 | Schaefer et al. |
| 2014/0165698 A1* | 6/2014 | Mochizuki ......... G01N 33/4972 73/23.3 |
| 2015/0295562 A1* | 10/2015 | Agarwal ............ G01N 33/0047 73/23.3 |
| 2016/0017136 A1 | 1/2016 | Hochstetter et al. |
| 2016/0037878 A1 | 2/2016 | Yabe et al. |
| 2016/0200907 A1 | 7/2016 | Amin-Sanayei et al. |
| 2018/0312678 A1* | 11/2018 | Aoki ....................... C08L 27/18 |

FOREIGN PATENT DOCUMENTS

| EP | 3 124 539 A1 | 2/2017 |
| EP | 3 124 541 A1 | 2/2017 |
| FR | 2 987 624 | 5/2019 |
| WO | WO 2007/080338 A2 | 7/2007 |
| WO | WO 2007/080338 A2 | 7/2007 |
| WO | WO 2015/028761 A1 | 3/2015 |
| WO | WO 2015/028761 A1 | 3/2015 |
| WO | WO 2015/031569 A1 | 3/2015 |
| WO | WO 2017/021207 A1 | 2/2017 |

OTHER PUBLICATIONS

Chemical Abstracts Service (online) Columbus Ohio, Nishiwaki, Koichi et al "Fluorine-contqaining polymer aqueous dispersions with excellent sedimentation stability" XP0027778.
Japan Synthetic Rubber Co LTD, Oct. 9, 1995; Pages (1-2).

* cited by examiner

*Primary Examiner* — Nicholas R Krasnow
(74) *Attorney, Agent, or Firm* — Joanne Rossi

(57) ABSTRACT

The invention relates to an object or object part made from a composition comprising at least one fluoropolymer F, wherein: —the at least one fluoropolymer F comprises vinylidene fluoride units and at least 30 wt. % of units derived from at least one monomer of formula (I): (I) $CX_1X_2=CX_3Y$, wherein each of $X_1$, $X_2$ and $X_3$ is independently selected from H, Cl, F, Br, I and alkyl groups comprising from 1 to 3 carbon atoms which are optionally partly or fully halogenated and Y is an alkyl group comprising from 1 to 3 carbon atoms which is optionally partly or fully halogenated; —the proportion of the at least one fluoropolymer F in the composition is at least 80 wt. %; and—the viscosity of the composition is at least 1000 Pa·s at a temperature of 230° C. and at a shear rate of 100 s⁻1.

14 Claims, No Drawings

FLUOROPOLYMER THERMOPLASTIC ELASTOMER

CROSS-REFERENCE TO RELATED APPLICATIONS

This application is a national stage application under 35 U.S.C. § 371 of PCT/EP2018/064546 filed Jun. 4, 2018, which claims priority based on French patent application FR17.55032, filed Jun. 6, 2017, the contents of each are incorporated herein by reference in their entireties.

TECHNICAL FIELD

The present invention relates to a thermoplastic elastomer composition based on fluoropolymers, and preferably on copolymers comprising vinylidene fluoride (VDF)-derived units and hexafluoropropene (HFP)-derived units. This composition makes it possible to manufacture wearable or consumer electronics objects or object parts using a thermoplastic shaping process.

TECHNICAL BACKGROUND

In the consumer electronics and wearables industry, a number of devices are intended to be in contact with the human body.

There are a number of desired requirements for such devices, such as high softness and elasticity, a soft touch, stain and chemical resistance, as well as ease of processing into various shapes.

Two main kinds of polymers are conventionally used in these applications.

First, crosslinked fluoroelastomers, which generally have excellent mechanical properties and chemical resistance, some (but limited) stain resistance but are difficult to process.

Second, thermoplastic elastomers such as polyurethanes, which are generally easy to process and have good mechanical properties but generally have poor stain and chemical resistance.

Besides, the desired "soft touch" property usually requires the addition of a silicone coating on top of these polymers.

By way of example, document US 2016/0037878 discloses a wrist band made of a crosslinked fluoroelastomer. High cost and poor yield are the two main drawbacks of such a material.

Document U.S. Pat. No. 7,718,727 discloses blends of fluororesins and crosslinked silicone. Such blends have good mechanical properties and improved touch feeling but are difficult to transform into final objects, due to the reactive nature of the silicone phase. In this document, reactive extrusion is used, i.e. a process which is difficult and costly to properly control.

Document US 2011/0009572 relates to non-crosslinked silicone copolymers blended in thermoplastic matrices. The processability of such compositions is good, but they are believed to have limited stain and chemical resistance.

Document U.S. Pat. No. 6,586,547 discloses a grade of P(VDF-HFP) copolymer, which is offered for use in paint bases for coatings.

Document WO 2015/028761 discloses a composition comprising a polyvinylidene fluoride (PVDF) polymer and a PVDF-based copolymer, for use in making pipes especially in the oil and gas industry.

Document FR 2987624 discloses a composition containing a PVDF homopolymer, a plasticizer, and from 10 to 35 wt. % of a PVDF-based copolymer. This composition is used in particular for making pipes. This composition does not have elastomeric properties.

Document WO 2015/031569 discloses a fluoropolymer composite blend comprising a continuous fluoropolymer phase and uniformly dispersed discrete domains of a fluorinated copolymer B, as well as articles made of this composite blend. This composite blend does not have elastomeric properties.

There is thus a need for providing a polymer composition suitable for the wearables and consumer electronics industry, which has high softness and elasticity, stain and chemical resistance, and is easy to process into various shapes.

SUMMARY OF THE INVENTION

It is a first object of the invention to provide an object or object part made from a composition comprising at least one fluoropolymer F, wherein:
  the at least one fluoropolymer F comprises vinylidene fluoride units and at least 30 wt. % of units derived from at least one monomer of formula (I):

$$CX_1X_2=CX_3Y, \qquad (I)$$

wherein each of $X_1$, $X_2$ and $X_3$ is independently selected from H, Cl, F, Br, I and alkyl groups comprising from 1 to 3 carbon atoms which are optionally partly or fully halogenated and Y is an alkyl group comprising from 1 to 3 carbon atoms which is optionally partly or fully halogenated;
  the total proportion of fluoropolymer(s) F in the composition is at least 80 wt. %; and
  the viscosity of the composition is at least 1000 Pa·s at a temperature of 230° C. and at a shear rate of 100 s$^{-1}$.
In some embodiments:
  Y is $CF_3$; and/or
  each of $X_1$, $X_2$ and $X_3$ is independently selected from H, Cl, F, Br and I;
  or, preferably, the at least one monomer of formula (I) is hexafluoropropene; and more preferably the at least one fluoropolymer F is or comprises a poly(vinylidene fluoride-co-hexafluoropropene) copolymer.

In some embodiments, the at least one fluoropolymer F comprises from 32 to 40 wt. %, preferably from 33 to 36 wt. %, of units derived from the at least one monomer of formula (I).

In some embodiments, the viscosity of the composition is from 1000 to 4400 Pa·s, preferably from 1500 to 4000 Pa·s, at a temperature of 230° C. and at a shear rate of 100 s$^{-1}$.

In some embodiments, the total proportion of fluoropolymer(s) F in the composition is at least 85 wt. %, preferably at least 90 wt. %, more preferably at least 95 wt. %.

In some embodiments, the object or object part has a minimum dimension of at least 100 μm, preferably at least 500 μm.

In some embodiments, the object is selected from wearable objects and consumer electronics objects, and is preferably selected from supports for sensors, supports for electronic devices, casings, belts, gloves, pads, strips and bands.

It is another object of the invention to provide a process of making the object or object part defined above, comprising a step of shaping said composition.

In some embodiments, the process comprises the steps of:
  providing the composition in a solid form, preferably in the form of a powder, of granules, of pellets or of crumbs;

softening the composition by raising the temperature;
shaping the softened composition;
cooling down.

In some embodiments, said shaping is performed by compression molding, injection molding, hot pressing or extrusion.

In some embodiments, the composition is not subjected to any crosslinking.

In some embodiments, the composition is crosslinked after cooling down, preferably by irradiation.

The present invention makes it possible to address the need mentioned above. In particular the invention provides a polymer composition suitable for the wearables and consumer electronics industry, which has high softness and elasticity, stain and chemical resistance, and is easy to process into various shapes. Advantageously, the composition also provides soft touch. Advantageously, the composition is also suitable for food contact.

This is achieved by providing a composition comprising at least 80 wt. % of at least one fluoropolymer F comprising VDF units and at least 30 wt. % of units derived from at least one monomer of formula (I), such as HFP, wherein said composition has a viscosity of at least 1000 Pa·s, preferably at least 1500 Pa·s.

Without wishing to be bound by a theory, it is believed that the relatively high proportion of units derived from the at least one monomer of formula (I) makes it possibly to obtain a low- or non-crystalline fluoropolymer F; and that the relatively high viscosity of the at least one fluoropolymer F corresponds to a relatively high molecular weight, which makes it possible to achieve an elastomeric behavior.

Therefore, it is possible to shape the composition of the invention into various objects or object parts in a simple and cost-effective manner owing to conventional thermoplastic processing techniques, without any curing step.

Since the composition of the invention can be processed similarly to thermoplastic materials, any portion of the composition lost during processing can be easily recycled. The same applies to used or spent objects or object parts made with the composition of the invention, if the composition is not cured in the manufacturing process.

DESCRIPTION OF EMBODIMENTS

The invention will now be described in more detail without limitation in the following description.

Fluoropolymer F

The composition of the invention comprises at least one fluoropolymer F. In some embodiments, only one fluoropolymer F is used. In other embodiments, a mixture or two (or more than two) fluoropolymers F is present in the composition.

In the present applications, the expression "units derived from" a certain monomer designates structural repeat units in the polymer which correspond to the polymerized form of said monomer.

The (or each) fluoropolymer F comprises VDF-derived units as well as units derived from at least one monomer of formula (I):

$$CX_1X_2=CX_3Y, \quad (I)$$

wherein each of $X_1$, $X_2$ and $X_3$ is independently selected from H, Cl, F, Br, I and alkyl groups comprising from 1 to 3 carbon atoms which are optionally partly or fully halogenated and Y is an alkyl group comprising from 1 to 3 carbon atoms which is optionally partly or fully halogenated.

In some preferred embodiments, the (or each) fluoropolymer F is a P(VDF-Z) copolymer, wherein Z designates one monomer of formula (I).

In other embodiments, the (or each) fluoropolymer F consists of units derived from three different monomers (i.e. it is a terpolymer) or of units derived from at least four different monomers. In such embodiments, said fluoropolymer F may comprise units derived from more than one monomer of formula (I); and/or said fluoropolymer F may comprise units derived from one or more monomers other than VDF and the monomers of formula (I).

In particular variants of the monomer of formula (I):
the monomer of formula (I) comprises from 3 to 6 carbon atoms, preferably from 3 to 5 carbon atoms, more preferably from 3 to 4 carbon atoms, and most preferably 3 carbon atoms;
Y is an alkyl group comprising from 1 to 2 carbon atoms which is optionally partly or fully halogenated;
Y is a methyl group which is optionally partly or fully halogenated;
Y is partly or fully halogenated;
Y is fully halogenated;
Y comprises at least one fluorine substituent;
Y is an alkyl group comprising from 1 to 3 carbon atoms which is optionally partly or fully fluorinated, and preferably fully fluorinated;
each of $X_1$, $X_2$ and $X_3$ is independently selected from H, Cl, F, Br and I;
each of $X_1$, $X_2$ and $X_3$ is independently selected from H, Cl and F;
each of $X_1$, $X_2$ and $X_3$ is independently selected from H and F;
each of $X_1$, $X_2$ and $X_3$ is F;
the monomer of formula (I) is a perfluorinated (i.e. fully fluorinated) olefin.

Possible monomers of formula (I) include HFP, 3,3,3-trifluoropropene, 1,3,3,3-tetrafluoropropene (1234ze), 2,3,3,3-tetrafluoropropene (1234yf), 1-chloro-3,3,3-trifluoropropene (1233zd) and 2-chloro-3,3,3-trifluoropropene (1233xf). 1234ze and 1233zd may be used in their cis or trans forms, preferably in their trans forms.

HFP and 1234ze are even more preferred monomers of formula (I).

HFP is the most preferred monomer of formula (I).

Accordingly, in preferred embodiments of the invention, the at least one fluoropolymer F comprises or is P(VDF-HFP).

In case units derived from other monomers than VDF monomers and monomers of formula (I) are present in the fluoropolymer F, they are preferably of formula (II):

$$CX_4X_5=CX_6X_7, \quad (II)$$

wherein each of $X_4$, $X_5$, $X_6$ and $X_7$ is independently selected from H, Cl and F, with the proviso that at least one of $X_6$ and $X_7$ is not F if both $X_4$=H and $X_5$=H (or that at least one of $X_6$ and $X_7$ is not H if both $X_4$=F and $X_5$=F).

Preferably, at least one of $X_4$, $X_5$, $X_6$ and $X_7$ is F.

Said monomers of formula (II) are more preferably selected from vinyl fluoride, trifluoroethylene (TrFE), tetrafluoroethylene, chlorotrifluoroethylene and 1,1-chlorofluoroethylene.

The proportion of units derived from monomers of formula (I) in the (or each) fluoropolymer F is at least 30 wt. % relative to all units in the fluoropolymer F. More preferably it can be: from 30 to 31 wt. %; or from 31 to 32 wt. %; or from 32 to 33 wt. %; or from 33 to 34 wt. %; or from 34 to 35 wt. %; or from 35 to 36 wt. %; or from 36 to 37 wt.

%; or from 37 to 38 wt. %; or from 38 to 39 wt. %; or from 39 to 40 wt. %; or more than 40 wt. %.

The summed proportion of units derived from monomers of VDF and monomers of formula (I) in the (or each) fluoropolymer F (relative to all units in the fluoropolymer F) can for example be: at least 75 wt. %; or at least 80 wt. %; or at least 85 wt. %; or at least 90 wt. %; or at least 95 wt. %. It can also be approximately 100 wt. %.

The weight composition of a fluoropolymer F can be determined by various methods. Conventional methods for the elemental analysis of notably carbon, fluorine and chlorine or bromine elements may result in a system of independent equations comprising independent unknowns for the proportion of the various units, which makes it possible to calculate the composition by weight of the fluoropolymer F.

It is also possible to employ multinuclear NMR techniques, such as proton (1H) and fluorine (19F) NMR, and to analyze a solution of the fluoropolymer in an appropriate deuterated solvent. The NMR spectrum is recorded on an FT-NMR spectrometer equipped with a multinuclear probe. Specific signals resulting from different units in the produced spectra are then identified. For example, TrFE-derived units, if present, result, in proton NMR, in a specific signal characteristic of the CFH group (at approximately 5 ppm). The same applies to the $CH_2$ groups of VDF-derived units (unresolved peak centered at 3 ppm). The relative integration of the two signals gives access to the relative abundance of the two monomers, that is to say the VDF/TrFE molar ratio (if TrFE-derived units are present).

Similarly, a $CF_3$ group as is present in HFP-derived units results in a characteristic and well-isolated signal in fluorine NMR. The combination of the relative integrations of the different signals obtained in proton NMR and/or in fluorine NMR results in a system of equations, the solution of which provides the molar proportions of the different units in the fluoropolymer (from which the weight proportions may be calculated).

Document U.S. Pat. No. 6,586,547 provides an example of how NMR may be used to determine the content of HFP-derived units in a P(VDF-HFP) copolymer.

Finally, it is possible to combine the elemental analysis, for example for heteroatoms such as chlorine or bromine, and the NMR analysis.

The (or each) fluoropolymer F of the invention is preferably a statistical (random), linear polymer.

The at least one fluoropolymer F (i.e. either the single fluoropolymer F or the mixture of fluoropolymers F) is preferably an elastomer.

By "elastomer" is herein meant a material having an elastic recovery of at least 80%, preferably at least 90%, when subjected to a stress/relaxation protocol according to ASTM standard, Special Bulletin No. 184. This protocol is applied on a band of 100×12.8×2 mm. This sample is submitted to a tensile deformation of 100% applied at a speed of 100 mm/min at 23° C. The 100% deformation is maintained for 5 minutes and the sample is then released. After 5 minutes of relaxation the residual deformation is measured. The elastic recovery is defined as the initial sample length minus the residual deformation. The stress/relaxation protocol is applied using a MTS 810 dynamometer equipped with a 25 kN cell.

The at least one fluoropolymer F (i.e. either the single fluoropolymer F or the mixture of fluoropolymers F) preferably has low or no crystallinity, which is characterized by a heat of fusion calculated from the first endotherm detected in a differential scanning calorimeter (DSC) scan of less than 20 J/g, preferably less than 15 J/g and even more preferably less than 10 J/g. DSC scans are performed according to ASTM D 451-97 using a Perkin Elmer 7 DSC apparatus with an Intercooler II attachment. The instrument is equipped with a dry box with a nitrogen purge through the dry box. Specimens of 9 to 10 mg are used and crimped in aluminum pans. The DSC run is begun at −50° C., followed by a 10° C./min ramp to 180° C.

According some embodiments, the at least one fluoropolymer F has a viscosity of at least 1000 Pa·s, and preferably at least 1500 Pa·s.

In the context of the present application, unless otherwise indicated, all viscosities are melt viscosities which are measured at a temperature of 230° C. and at a shear rate of 100 $s^{-1}$. More specifically, melt viscosities may be measured according to ASTM D4440 using a PHYSICA MCR301 apparatus equipped with two parallel plates. Measurements are performed at 230° C. with a frequency ranging from 628 to 0.0628 rad·$s^{-1}$ and the viscosity is recorded at 100 rad·$s^{-1}$.

If more than one fluoropolymer F is present in the composition, the viscosity values mentioned herein are those of the corresponding mixture of fluoropolymers F, in the same relative proportions as in the composition.

The molecular weight of fluoropolymers may be difficult to accurately determine, when it is relatively high. Therefore, in the present application, it is more convenient and more accurate to indirectly characterize the molecular weight of the at least one fluoropolymer F by referring to its overall viscosity.

In some embodiments, the at least one fluoropolymer F has a viscosity of from 1000 to 1200 Pa·s; or from 1200 to 1400 Pa·s; or from 1400 to 1600 Pa·s; or from 1600 to 1800 Pa·s; or from 1800 to 2000 Pa·s; or from 2000 to 2200 Pa·s; or from 2200 to 2400 Pa·s; or from 2400 to 2600 Pa·s; or from 2800 to 3000 Pa·s; or from 3000 to 3200 Pa·s; or from 3200 to 3400 Pa·s; or from 3600 to 3800 Pa·s; or from 3800 to 4000 Pa·s; or from 4000 to 4200 Pa·s; or from 4200 to 4400 Pa·s; or more than 4400 Pa·s.

A given fluoropolymer F may have a monomodal chain length distribution or a multimodal chain length distribution, such as a bimodal chain length distribution.

For instance, the at least one fluoropolymer F may be a mixture of at least one fluoropolymer F having a first viscosity and at least one fluoropolymer F having a second viscosity, wherein the first viscosity is lower than the second viscosity. In particular, the first viscosity may be less than 1500 Pa·s and the second viscosity may be more than 1500 Pa·s; preferably the first viscosity may be less than 1000 Pa·s, and the second viscosity may be more than 2000 or more than 3000 Pa·s. In such embodiments, and without wishing to be bound by any theory, it is assumed that the fluoropolymer F having the second viscosity may confer elastomeric properties to the composition, while the fluoropolymer F having the first viscosity may act as a plasticizer.

The at least one fluoropolymer F may be homogenous or heterogenous. A homogenous polymer has a uniform chain structure, that is the statistic distribution of units derived from various monomers does substantially not vary between the chains. In a heterogenous polymer, the distribution of units derived from various monomers in the chains is multimodal or spread out. A heterogenous polymer thus comprises chains which contain more units of a certain kind, and other chains which contain fewer units of this kind. An example of heterogenous polymer can be found in document WO 2007/080338.

The at least one fluoropolymer F may be prepared using any known polymerization process, such as emulsion polymerization, suspension polymerization and solution polymerization. In particular, the at least one fluoropolymer F may be prepared by emulsion polymerization, preferably as described from col.6 l.66 to col.9 l.60 in document U.S. Pat. No. 6,586,547, in connection with P(VDF-HFP)-based polymers.

Composition

The composition of the present invention comprises the at least one fluoropolymer F as described above.

In some embodiments, the composition consists of, or essentially consists of, the at least one fluoropolymer F.

In some embodiments, the composition may comprise further components and/or additives. In this case, the weight proportion of all fluoropolymers F (as defined above) in the composition is at least 80%, preferably or at least 85%, or at least 90%, or at least 92%, or at least 94%, or at least 95%, or at least 96%, or at least 97%, or at least 98%.

Optionally, other fluoropolymers (i.e. fluoropolymers which do not correspond to the definition of fluoropolymers F provided above, such as e.g. PVDF homopolymers, or P(VDF-HFP) copolymers comprising a low amount of HFP units of less than 25 wt. %, etc.) may be present in the composition.

Additives which are optionally present in the composition may notably include surfactants, rheology modifiers such as plasticizers, ageing resistance agents, pigments or dyes, fillers (including nanofillers), or any residual additives used for synthesizing the at least one fluoropolymer F or other polymers which may be present.

Plasticizers are defined in the Encyclopedia of Polymer Science and Engineering (Wiley and Sons, 1989), on p. 568-569 and p. 588-593. They can be monomeric or polymeric. Dibutyl-sebacate, dioctyl-phthalate, N-n-butylsulfonamide, polymeric polyesters and combinations thereof are examples of suitable plasticizers. Suitable polymeric polyesters may be for example derived from adipic, azelaic or sebacic acids and diols and combinations thereof. Their molecular weight is preferably at least 1500 g/mol, more preferably at least 1800 g/mol.

When additives are present, they are preferably present in an amount of from 0.1 to 10 wt. % in the composition, more preferably of from 0.2 to 5 wt. %, and most preferably of from 0.5 to 3 wt. %.

According to the invention, the viscosity of the composition is at least 1000 Pa·s, and preferably at least 1500 Pa·s. In some embodiments, the viscosity of the composition is from 1000 to 1200 Pa·s; or from 1200 to 1400 Pa·s; or from 1400 to 1600 Pa·s; or from 1600 to 1800 Pa·s; or from 1800 to 2000 Pa·s; or from 2000 to 2200 Pa·s; or from 2200 to 2400 Pa·s; or from 2400 to 2600 Pa·s; or from 2800 to 3000 Pa·s; or from 3000 to 3200 Pa·s; or from 3200 to 3400 Pa·s; or from 3600 to 3800 Pa·s; or from 3800 to 4000 Pa·s; or from 4000 to 4200 Pa·s; or from 4200 to 4400 Pa·s; or more than 4400 Pa·s.

Most preferably, the composition of the invention does not contain any crosslinking agent or curing agent.

The composition of the invention may be initially produced in a solid form, such as a powder, granules, pellets or crumbs. Then, it can be processed so as to be shaped into solid objects or object parts, as further described below.

The density of the composition is preferably from 1.6 to 2.0, more preferably from 1.7 to 1.9, and most preferably approximately 1.8. Therefore, the density of the composition is preferably lower than that of a typical crosslinked fluoroelastomer, which makes it possible to afford savings in the manufacturing process. On the other hand, the density of the composition is sufficiently high to achieve a perception of quality by the consumer, when the composition is used for making an object or object part as described below.

The composition of the invention is preferably characterized by one or more, and preferably all, of the following parameters:
- deformation at break of more than 300%, preferably more than 350%, more preferably more than 400%, most preferably more than 450% (measured at 25° C. and at a rate of 25 mm/min, according to ISO 527);
- hardness of less than 90 Shore A, preferably of less than 80 Shore A, measured according to ISO 868;
- elastic recovery of at least 80%, preferably at least 85%, more preferably at least 90% when exposed to the stress relaxation protocol as defined in ASTM standard, Special Bulletin No. 184 (accordingly, the composition of the invention is preferably an elastomer composition as defined above).

Objects or Object Parts Made of the Composition

Starting from e.g. a powder, granules, pellets or crumbs of the composition of the invention, various objects or object parts may be manufactured.

Alternatively, objects may be manufactured by making the composition of the invention (for instance by blending the at least one fluoropolymer F with one or more additional components) and directly producing this composition in the form of an object or object part.

In some embodiments, the objects made according to the invention consist of the composition of the invention. In other embodiments, said objects comprise one or more parts consisting of the composition of the invention, and one or more additional parts. For instance, the composition of the invention can be present as one or more layers in a multilayer object.

The objects or object parts of the invention can be manufactured by a process comprising at least one step of shaping the composition of the invention into a desired shape.

Preferably, said shaping is performed by softening the composition by subjecting it to a relatively high temperature, preferably mixing it, supplying the desired shape to the softened composition and cooling down.

The temperature at which the composition is softened is preferably from 150 to 260° C., more preferably from 180 to 260° C. and even more preferably from 220 to 260° C.

Most preferably, no crosslinking or curing of the composition takes place during the step of shaping and cooling down.

Preferably, no crosslinking or curing of the composition takes place during the entire manufacturing process, so that the composition is not crosslinked or cured in the object or object part.

Alternatively, crosslinking may be performed by way of a post-treatment step after shaping and cooling down, preferably by irradiation with e.g. beta, gamma or X-ray radiation. Such crosslinking may expand the use temperature range of the object or object part.

The shaping step is preferably an extrusion step, or a hot pressing step, or a molding step, such as an injection molding step or a compression molding step.

A compression molding step for instance can consist in applying high pressure for a couple of minutes at the above temperature to provide the desired shape to the object or object part, and then cool down the material for e.g. 3 to 5 minutes to allow demolding.

Injection molding can be performed in the same temperature range at low speed in a mold maintained at 65° C.

The composition of the invention may optionally be shaped on a preexisting part (e.g. by overmolding).

Optionally, an additional part of the object may be shaped on the shaped composition of the invention (e.g. by overmolding). This additional part may optionally be also made of the composition of the invention.

Alternatively, two or more parts of the object may be made separately assembled by any known technique such as gluing.

As an alternative to the above thermoplastic processing techniques, the composition of the invention can also be suspended and/or dissolved in a liquid vehicle so as to form an ink, which is then deposited on a surface, before evaporating the liquid vehicle.

The liquid vehicle is preferably a solvent. More preferably, it is selected from dimethylformamide, dimethylacetamide, dimethylsulfoxide, ketones, such as acetone, methylethylketone, methylisobutylketone and cyclopentanone, furans, such as tetrahydrofurane, esters, such as methyl acetate, ethyl acetate, propyl acetate, butyl acetate and propylene glycol methyl ether acetate; carbonates, such as dimethylcarbonate, phosphates, such as le triethylphosphate. Mixtures of these compounds may also be used.

The total weight concentration of the at least one fluoropolymer F in the liquid vehicle may in particular be from 0.1 to 30%, preferably from 0.5 to 20%.

The ink may in particular be deposited on a glass surface or silicon surface or polymer surface or metal surface. Said deposition may be notably performed by spin-coating, spray coating, bar coating, dip coating, roll-to-roll printing, serigraphy printing, lithography printing or ink-jet printing.

Preferably, no coating, and in particular no silicone-based coating is provided on top of the objects or object parts made of the composition of the invention.

Preferably, the objects or object parts made of the composition of the invention are not coatings themselves.

Accordingly, the objects or object parts made of the composition of the invention preferably have a minimum dimension of at least 100 μm, preferably at least 200 μm, or at least 500 μm, or at least 1 mm, or at least 2 mm.

Said minimum dimension may in particular be a length, a width, a depth, a thickness or a diameter.

For instance, for a band-like or plate-like object, the minimum dimension is the average thickness; for a substantially elongated cylindrical object, the minimum dimension is the average diameter of the cylinder; etc.

The objects of the invention may in particular be selected from wearable objects and consumer electronics objects.

In particular embodiments, they are intended to be in contact with the human body and more specifically with human skin.

Preferred examples include supports for sensors, supports for electronic devices, casings, belts, gloves, pads, strips and bands.

EXAMPLES

The following examples illustrate the invention without limiting it.

Materials

F1: statistic copolymer of VDF and HFP (HFP weight content=33%) having a melt viscosity of 4000 Pa·s at 100 s$^{-1}$, 230° C.

F2: statistic copolymer of VDF and HFP (HFP weight content=33%) having a melt viscosity of 2000 Pa·s at 100 s$^{-1}$, 230° C.

F3: statistic copolymer of VDF and HFP (HFP weight content=33%) having a melt viscosity of 1000 Pa·s at 100 s$^{-1}$, 230° C.

F4: statistic copolymer of VDF and HFP (HFP weight content=33%) having a melt viscosity of 500 Pa·s at 100 s$^{-1}$, 230° C.

F5: blend of 50 wt. % of copolymer F1 and 50 wt. % of copolymer F4.

F6: blend of 90 wt. % of copolymer F2 and 10 wt. % of a statistic copolymer of VDF and HFP (HFP weight content=18%) having a melt viscosity of 300 Pa·s at 100 s$^{-1}$, 230° C.

P7: statistic copolymer of VDF and HFP (HFP weight content=25%) having a melt viscosity of 1600 Pa·s at 100 s$^{-1}$, 230° C.

T8: ether based thermoplastic polyurethane bloc copolymer Desmopan 9370 A commercialized by Covestro.

Characterization

Melt viscosity was measured according to ASTM D4440 using a PHYSICA MCR301 apparatus equipped with two parallel plates. The rheology measurement was performed at 230° C. and 100 s$^{-1}$.

Material crystallinity was characterized by its heat of fusion during first endotherm measured with a differential scanner calorimeter according to ASTM D 451-97 using a Perkin Elmer 7 DSC apparatus with an Intercooler II attachment. The instrument was equipped with a dry box with a nitrogen purge through the dry box. Specimens of 9 to 10 mg were used and crimped in aluminum pans. The DSC run was begun at −50° C., followed by a 10° C./min ramp to 180° C.

Hardness was measured according to standard ISO 868 on 4 mm thick plates. The measurement was performed on a Hildebrand apparatus at 23° C. in Shore A range after 15 s of pin plied on top of the sample.

Tensile properties and in particular deformation at break were measured according to ISO 527 on a 1 A tensile bar at 23° C. and 25 mm/min. An MTS 810 dynamometer was used to perform the measurement.

Elastic recovery was measured according to ASTM standard, Special Bulletin No. 184 on bands of 100×12.8×2 mm. A tensile deformation of 100% was applied at a speed of 100 mm/min at 23° C. in a MTS 810 dynamometer equipped with a 25 kN cell. The 100% deformation was maintained for 5 minutes and the sample was then released. After 5 minutes of relaxation, the residual deformation was measured to determine the elastic recovery.

Stain resistance to ketchup and mustard was evaluated at 65° C., 90% of relative humidity. The contaminant was placed on a plate sample for 72 hours and then removed by a dry fabric. The color of the material was measured before and after exposure by a Minolta CM-3610d spectrocolorimeter using a D65 reference illuminant. The reflected spectrum was decomposed using the L*a*b* scale according to the ASTM D2244 standard. The color change was expressed by a ΔE measurement defined as $\Delta E = ((L_2^* - L_1^*)^2 + (a_2^* - a_1^*)^2 + (b_2^* - b_1^*)^2)^{1/2}$.

Properties

|  | Viscosity (Pa·s) | Melting enthalpy (J/g) | Elastic recovery (%) | Shore A hardness | Tensile deformation at break (%) | ΔE after ketchup exposure | ΔE after mustard exposure |
| --- | --- | --- | --- | --- | --- | --- | --- |
| F1 | 4000 | 9 | 93 | 72 | >350 | 3 | 2 |
| F2 | 2000 | 11 | 91 | 70 | >350 | 3 | 2 |
| F3 | 1000 | 6 | 85 | 69 | >350 | 3 | 8 |
| F4 | 500 | 10 | <80 | 70 | >350 | 4 | 12 |
| F5 | 2500 | 11 | 92 | 71 | >350 | 3 | 3 |
| F6 | 1900 | 14 | 90 | 73 | >350 | 3 | 3 |
| P7 | 1600 | 25 | 75 | 93 | >350 | 4 | 4 |
| T8 |  |  | 95 | 70 | >350 | 26 | 22 |

The invention claimed is:

1. An object or object part comprising a composition comprising at least one fluoropolymer F, wherein:
the at least one fluoropolymer F comprises vinylidene fluoride units and at least 30 wt. % of units derived from at least one monomer of formula (I):

$$CX_1X_2=CX_3Y,\qquad(I)$$

wherein each of $X_1$, $X_2$ and $X_3$ is independently selected from H, Cl, F, Br, I and alkyl groups comprising from 1 to 3 carbon atoms which are optionally partly or fully halogenated and Y is an alkyl group comprising from 1 to 3 carbon atoms which is optionally partly or fully halogenated;
the total proportion of fluoropolymer(s) F in the composition is at least 80 wt. %; and
the viscosity of the at least one fluoropolymer F is at least 1000 Pa·s at a temperature of 230° C. and at a shear rate of 100 s$^{-1}$.

2. The object or object part of claim 1, wherein:
Y is $CF_3$; and/or
each of $X_1$, $X_2$ and $X_3$ is independently selected from H, Cl, F, Br and I.

3. The object or object part of claim 1, wherein the at least one fluoropolymer F comprises from 32 to 40 wt. % of units derived from the at least one monomer of formula (I).

4. The object or object part of claim 1, wherein the viscosity of the composition is from 1000 to 4400 Pa·s at a temperature of 230° C. and at a shear rate of 100 s$^{-1}$.

5. The object or object part of claim 1, wherein the total proportion of fluoropolymer(s) F in the composition is at least 85 wt. %.

6. The object or object part of claim 1, having a minimum dimension of at least 100 μm.

7. The object or object part of claim 1, wherein the object is selected from the group consisting of wearable objects and consumer electronics objects.

8. A process of making the object or object part of claim 1, comprising a step of shaping said composition.

9. The process of claim 8, comprising the steps of:
providing the composition in a solid form;
softening the composition by raising the temperature;
shaping the softened composition;
cooling down.

10. The process of claim 8, wherein said shaping is performed by compression molding, injection molding, hot pressing or extrusion.

11. The process of claim 8, wherein the composition is not subjected to any crosslinking.

12. The process of claim 8, wherein the composition is crosslinked after cooling down.

13. The object or object part of claim 1, wherein the at least one monomer of formula (I) is hexafluoropropene.

14. The object or object part of claim 1, wherein the object is selected from the group consisting of supports for sensors, supports for electronic devices, casings, belts, gloves, pads, strips and bands.

* * * * *